Oct. 29, 1940.　　　T. I. POTTER　　　2,219,789
REFRIGERATOR
Filed Dec. 29, 1936
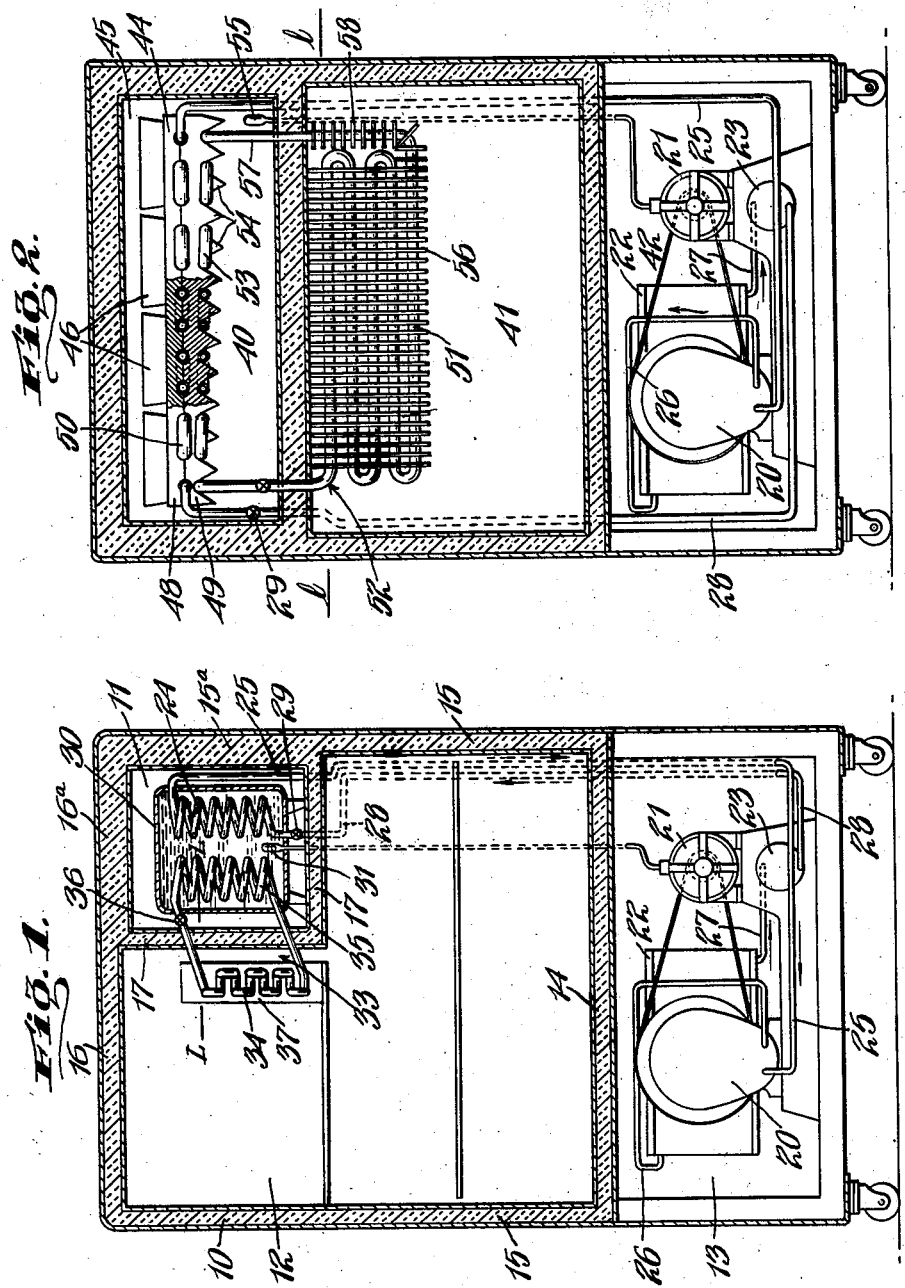
INVENTOR
THOMAS I. POTTER
BY
ATTORNEY Patented Oct. 29, 1940

2,219,789

UNITED STATES PATENT OFFICE 2,219,789

REFRIGERATOR

Thomas I. Potter, Buffalo, N. Y., assignor to Refrigeration Patents Corporation, Buffalo, N. Y., a corporation of New York Application December 29, 1936, Serial No. 118,028

8 Claims. (Cl. 62—125)

The present invention relates to household refrigerators of the type comprising two or more chambers, one of which is maintained at a sharp freezing temperature while the other is maintained at a refrigerating temperature above the freezing point without exposing a frosting surface therein. The air in the warmer chamber is thus ideally conditioned for the preservation of foods at temperatures above the freezing point. It has come to be realized in recent years that in displacing the old-time ice box, mechanical refrigeration did not enter the field with all the advantages in its favor. While lower and more uniform refrigeration temperatures were provided by mechanical refrigeration this result was obtained at the expense of dehydration of foods. It has been established that to preserve food without freezing the same it is necessary to keep the food at a temperature below 50 degrees Fahrenheit, but temperature is not by any means the sole consideration. There must also be a high degree of humidity to prevent spoilage due to dehydration. However, it is impossible to maintain high humidity in a chamber cooled by a chilling element whose surface temperature falls well below the freezing point, because the atmosphere in the chamber is robbed of its moisture by condensation which builds up as an ice coating on the chilling unit. If, on the other hand, the outer surface of the chilling unit is kept close to but above the freezing point, condensation will stop when the relative humidity in the chamber reaches 100 per cent at the temperature of said surface. The average temperature of the chamber will be possibly 10 degrees warmer than that of the chilling surface, depending upon the ratio of said surface to the capacity of the chamber, and the relative humidity in the chamber as a whole will therefore be around 70 to 80 per cent. This degree of humidity is ideal for food preservation because there is substantially no dehydration of the foods and the transfer of odors from one food to another is substantially reduced. It has been established that a relative humidity of 90 per cent or over would result in molding of certain foods.

A refrigerator designed to provide sharp freezing in one chamber and air conditioned food preservation in another is disclosed in Patent No. 2,056,165, issued October 6, 1936. The particular embodiment illustrated and described in said patent calls for two expansion units, one for each chamber, and both being part of the same compressor-condenser-expander circuit. My present invention has for an object to provide a similar plural chambered refrigerator, but with a single chilling unit in the compressor-condenser-expander circuit. For convenience, the warmer of the chambers will hereinafter be referred to as the "food chamber" and the other as the "freezing chamber," although it will be obvious that foods may also be stored in the freezing chamber. The single chilling unit referred to is located in the freezing chamber, and not only cools the same but also, by auxiliary means, cools the relatively warmer food compartment. The auxiliary means consists of a closed, uniform pressure circuit partly filled with a volatile liquid refrigerant, said circuit including an evaporator in the food chamber and a condenser in the freezing chamber adapted to be cooled by the chilling unit in the main circuit.

Another object of the invention is to so proportion the evaporator in the food chamber that under ordinary load conditions this chamber will be maintained at a desired refrigerating temperature without cooling the chilling unit therein below the freezing point of water.

Another object of the invention is to provide control means for automatically arresting the circulation of refrigerant through the auxiliary circuit when a desired low temperature has been reached in the food chamber. In my preferred embodiment this automatic control means consists of a gas, non-condensible at the lowest temperature to which the auxiliary circuit is subjected, this gas being introduced into the circuit at such a pressure as to keep the boiling point of the refrigerant in the auxiliary circuit close to but above the freezing point of water.

A further object of my invention is to proportion the heat radiating surface of the condenser in the auxiliary circuit to the heat absorbing surface of the evaporator so that under normal load conditions vaporized refrigerant will be liquefied in the condenser as fast as it is generated in the evaporator. By this arrangement, the pressure in the circuit will not be materially raised by evaporation of the refrigerant, but the pressure and, hence, the boiling point of the refrigerant will remain substantially constant. It will be obvious that the efficiency of a chilling unit is lowered as its temperature rises, but by thus proportioning the condenser to liquefy the vapor as fast as it is generated the temperature of the evaporation is prevented from rising above a substantially fixed boiling point, despite wide variations of the heat load in the food chamber.

Other objects and advantages of my invention will appear in the following description of two specific embodiments and thereafter the novelty and scope of my invention will be set forth in the claims.

In the accompanying drawing:

Figure 1 is a view in vertical section of a refrigerator embodying my invention; and Fig. 2 is a similar view of a modified form.

The refrigerator shown in Figure 1 comprises a cabinet 10 formed with a freezing chamber 11, a general food chamber 12 and a power plant chamber 13; the latter being located at the bottom of the cabinet. Chamber 12 is separated from the chamber 13 by a bottom wall 14 of insulation material. Side walls 15 and a top wall 16 of insulation material separate the chamber 12 from the outside atmosphere. The freezing chamber 11 which occupies the upper right hand corner of the cabinet, as shown in Fig. 1, is separated from the food chamber 12 by walls 17 of insulation material, and also from the outside atmosphere by thickened extensions 15a and 16a of the side and top walls 15 and 16, respectively.

In the chamber 13 there is a compressor 20, electric otor 21 adapted to drive the compressor, a condenser 22, and a receiver 23. In the freezing chamber 11 there is an expansion coil 24 from which vaporized refrigerant is withdrawn by the compressor through a low pressure line 25. Compressed refrigerant is delivered from the compressor through a line 26 to the condenser 22 and liquefied refrigerant from the condenser is drawn off into the receiver through a line 27. A high pressure line 28 leads from the receiver to an expansion valve 29 which controls the admission of liquefied refrigerant to the expansion coil 24. The capacity of this coil is sufficient to cool both of the chambers 11 and 12 to desired temperatures under normal heat load conditions.

The coil 24 is submerged in brine in a tank 30 and a thermostat 31 in this tank is operatively connected to suitable control means in the circuit of the motor so as to stop the latter when the temperature of the brine drops below a predetermined minimum and to restart the motor when the temperature of the brine rises above a predetermined maximum.

To cool the chamber 12 I provide a closed auxiliary circuit 33. This circuit comprises an evaporator or expansion coil 34 in chamber 12 and a condenser coil 35 in the chamber 11. This condenser is preferably placed in the brine tank 30, so that the brine will convey heat from the condenser to the coil 24. The circuit 33 is uninterrupted throughout, so that except for gravity heads the pressure will be substantially uniform throughout. The circuit is partly filled with a volatile liquid refrigerant. As shown in Fig. 1, the evaporator 34 is dropped below the condenser 33 and the liquid level in the circuit is substantially on line L—L or close to the top of the evaporator. This leaves ample space for accumulation of vapor in the upper part of the circuit. Air or any other suitable gas which will not condense at the minimum temperatures prevailing in the brine tank is introduced into the circuit to build up a pressure therein which will raise the boiling point of the refrigerant in the circuit just above the freezing point of water. An inlet port 36 is provided for the admission of the refrigerant and non-condensing gas, and after the circuit has been charged, the inlet port 36 may be permanently sealed.

Since the minimum temperature in the expansion coil 34 is above the freezing point of water, it will be obvious that the heat absorbing surface of the coil must be considerably greater than that of a coil whose surface temperature is permitted to drop well below the freezing point. It is well recognized that for efficient refrigeration the temperature in the food chamber must not rise above 50 degrees, and to prevent dehydration of foods, due to the collection of frost on the freezing unit, it is essential that the surface temperature of the chilling unit be maintained above the freezing point. In order to extend the heat absorbing area of coil 34 whose surface temperature is not permitted to drop below the freezing point, I provide heat absorbing fins 37 on the coil. Manifestly other means may also be provided for increasing the heat absorbing area of the chilling unit.

In operation, the temperature of the chamber 11 will be maintained at a low point determined by the setting of the thermostat 31. It will be understood, of course, that other temperature control means well known in the art may also be employed to control the refrigerating system so that the brine tank will be maintained at a substantially constant sharp freezing temperature. The coil 24, however, does not only have to take care of the heat which enters chamber 11, but also has to carry the heat load in the chamber 12. Thus, as heat is introduced into the chamber 12 either by leakage through the walls, by the introduction of foods therein or by any other means, this heat when it rises above the boiling point of the refrigerant in the closed circuit will cause the liquid in coil 34 to evaporate, and the resultant vaporized refrigerant will then pass over into the condenser 35 where it will be chilled and liquefied. The liquefied refrigerant then flows by gravity back into the coil 34. Thus, there will be a continuous circulation of the refrigerant in the circuit 33 until the temperature of the air impinging on the coil 34 and fins 37 drops below the boiling point of the liquid refrigerant in the coil. As long as the condenser 35 can keep pace with the evaporator 34 in condensing the vapors as fast as they are generated, there will be no rise of pressure in the circuit 33 and the coil 34 will operate at its maximum efficiency. The heat absorbed by the condenser 35 obviously passes into the brine tank and thence into the coil 24, so that the entire heat load is taken care of by the coil 24. The parts are so proportioned that under normal operating conditions the temperature of chamber 12 will not rise above 50 degrees Fahrenheit. If the pressure in the circuit 33 is set to produce boiling of the refrigerant at a temperature of 35 degrees Fahrenheit the maximum temperature differential between chamber 12 and coil 34 will be 15 degrees. On the other hand, if the brine tank 30 is set to operate at a temperature of say zero Fahrenheit and the refrigerant which enters the condenser coil 35 has a temperature of 33 degrees Fahrenheit the temperature differential between condenser 35 and brine tank 30 will be more than double the temperature differential between the evaporator and chamber 12. Thus, the surface area of the condenser may be half the heat absorbing area of coil 34 and yet the vapors will be liquefied in this condenser as fast as they are generated in the evaporator. As a matter of fact, the surface area of the condenser may be much further reduced, because there will be a much more rapid flow of heat from the condenser by way of the brine into the coil 24, than from the air of chamber 12 into the boiler 34.

In the construction shown in Fig. 2, the same principle of refrigeration is employed, but the refrigerator cabinet is somewhat differently arranged to provide a larger freezing chamber, and metal instead of liquid is used to provide a heat linkage between the condenser and the chilling unit of the main refrigerating circuit. The cabinet shown in Fig. 2 comprises a freezing chamber 40, a main food chamber 41 and a power plant chamber 42. The freezing unit employed to cool the chamber 40 consists of a shelf 44 which extends horizontally across the chamber 40 and partitions off an upper compartment 45. Trays 46 may be supported on the freezing shelf in compartment 45 to freeze ice cubes, desserts, etc. The freezing shelf 44 on which the trays 46 are supported is greatly exaggerated in the drawing in order to show its construction. Actually it occupies a very narrow space in the chamber 40 leaving ample room for storage of foods below the shelf. The freezing shelf 44 consists of a top plate 48 and a bottom plate 49. The plates are made of a metal which is a good heat conductor. The adjacent faces of the plates are grooved to receive an expansion coil 50 which is tightly clamped therebetween. This constitutes the chilling unit of a heat pumping system which is similar to that shown in Fig. 1. Accordingly the compressor, condenser, expansion valve and other corresponding parts of the pumping system are given the same reference numerals.

The food chamber 41 is cooled by a coil 51 located therein and forming part of a closed uniform pressure refrigerant circuit 52 including a condenser coil 53 in the chamber 40. This condenser coil is supported upon the lower side of the plate 49, and since this plate is made of a metal having good heat conducting properties there is a ready transfer of heat from the condenser 53 to the expansion coil 50. In order to give direction to the flow of refrigerant through the closed circuit the condenser is slightly inclined from the horizontal plane, as clearly shown in Fig. 2, so that the refrigerant that liquefies in the condenser will flow toward the right hand side of the coil as viewed in Fig. 2, building up a slightly higher head on that side and thereby causing the refrigerant to circulate clockwise, as viewed in Fig. 2. The plate 49 is preferably formed with heat absorbing ribs 54 which project between the coils of the condenser 53 and serve to absorb heat from the chamber 40. Any suitable control means 55 may be provided for keeping the temperature of the freezing shelf 48 between predetermined limits. Preferably the maximum temperature would be close to zero Fahrenheit, so as to produce sharp freezing of ice cubes or desserts in the compartment 45, while the main body of the chamber 45 would be maintained at a temperature well below the freezing point, say 10 to 12 degrees Fahrenheit. The refrigerant which is introduced into the closed circuit 52 is maintained by suitable means, such as compressed air or other gas, at a pressure which will raise its boiling point above the freezing point of water.

As shown in the drawing, the coil 51 may be provided with fins 56 to increase their heat absorbing area. In any case the parts are so thermally proportioned that the coil 51 will maintain the temperature in the chamber 41 above the freezing point of water and below 50 degrees Fahrenheit without exposing a frosting surface to said chamber. At the same time the condenser coil 53 is proportioned to liquefy the vaporized refrigerant as fast as it is generated in the coil 51 under normal heat load conditions, and finally the coil 50 is proportioned to carry off all the heat above a predetermined minimum temperature in the chamber 41 as well as the excess heat in chamber 40.

The liquid level in the auxiliary circuit 52 may be substantially on the line l—l, so that, unlike the arrangement shown in Fig. 1, there will be no standing liquid in the condenser. Such vapor as is liquefied in the condenser will drain by gravity into the pipe 57 which leads to the lower end of coil 51. This condensed refrigerant may be cooled well below the freezing point of water, and, to prevent accumulation of frost on the outer surface of that part of the pipe which lies within chamber 41, an obvious procedure would be to insulate said pipe. I prefer, however, to provide heat absorbing fins 56 on the pipe which will quickly raise the temperature of the inflowing liquid to the predetermined boiling point. The heat absorption provided by the fins 58 and 56 will prevent the surface temperature of that portion of the circuit which lies in chamber 41, from falling below the freezing point of water, no matter how low the temperature of the inflowing liquid may be.

While I have described two embodiments of my invention, it will be understood that these are to be taken as illustrative and not limitative and that I reserve the right to make various changes in form, construction and arrangement of parts which fall within the spirit and scope of the claims.

I claim:

1. A refrigerator comprising a cabinet formed with an upper chamber and a lower chamber, a freezing shelf in the upper chamber having an expansion coil embedded therein, means for pumping volatile refrigerant through said coil to refrigerate the upper chamber, a controller for said means adapted to maintain the temperature of the upper chamber between limits well below the freezing point of water, secondary means for refrigerating the lower chamber to a temperature above the freezing point of water, said secondary means comprising a closed circuit containing a volatile refrigerant at substantially uniform pressure throughout the circuit, said circuit including an evaporator in the lower chamber and a condenser coil embedded in said shelf, and means for preventing the refrigerant in the closed circuit from boiling when the temperature of the outer surface of the evaporator drops to a predetermined point above 32 degrees Fahrenheit, the heat absorbing capacity of the evaporator being sufficient to maintain the temperature of the lower chamber below 50 degrees Fahrenheit under normal heat loads.

2. A refrigerator comprising a cabinet formed with an upper chamber and a lower chamber, a freezing shelf in the upper chamber having an expansion coil embedded therein, means for pumping volatile refrigerant through said coil to refrigerate the upper chamber, a controller for said means adapted to maintain the temperature of the upper chamber between limits well below the freezing point of water, secondary means for refrigerating the lower chamber to a temperature above the freezing point of water, said secondary means comprising a closed circuit containing a volatile refrigerant at substantially uniform pressure throughout the circuit, said circuit including an evaporator in the lower chamber and a condenser coil carried by said shelf but inclined with respect to the shelf so as to drain into the evaporator, and means for preventing the refrigerant in the closed circuit from boiling when the temperature of the outer surface of the evaporator drops to a predetermined point above 32 degrees Fahrenheit, the heat absorbing capacity of the evaporator being sufficient to maintain the temperature of the lower chamber below 50 degrees Fahrenheit under normal heat loads.

3. A refrigerator comprising a cabinet formed with an upper chamber and a lower chamber, a freezing shelf in the upper chamber dividing the same into an upper ice tray compartment and a lower food freezing compartment, said shelf having an expansion coil embedded therein, means comprising a compressor, condenser and expansion valve for pumping volatile refrigerant through said coil to refrigerate the upper chamber, a controller for said means adapted to maintain the temperature of the upper chamber between limits well below the freezing point of water, secondary means for refrigerating the lower chamber to a temperature above the freezing point of water, said secondary means comprising a closed circuit containing a volatile refrigerant at substantially uniform pressure throughout the circuit, said circuit including an evaporator in the lower chamber and a condenser coil contacting with the underside of the shelf but inclined from a horizontal plane so as to drain into the evaporator, said shelf being formed with heat absorbing ribs projecting into the food freezing compartment between the condenser coils, and means for preventing the refrigerant in the closed circuit from boiling when the temperature of the outer surface of the evaporator drops to a predetermined point above 32 degrees Fahrenheit, the heat absorbing capacity of the evaporator being sufficient to maintain the temperature of the lower chamber below 50 degrees Fahrenheit under normal heat loads.

4. A freezer-condenser shelf for refrigerators, said shelf comprising a plate of high thermal conductivity having a horizontal expansion coil embedded therein, and a condenser coil also embedded therein, the condenser coil lying in a plane inclined from the horizontal to provide drainage toward an outlet end of the condenser coil.

5. A freezer-condenser shelf for refrigerators, said shelf comprising a plate of high thermal conductivity having a horizontal expansion coil embedded therein, and a condenser coil also embedded therein, the condenser coil lying in a plane inclined from the horizontal to provide drainage toward an outlet end of the condenser coil, said shelf being also formed with depending heat absorbing ribs.

6. A refrigerator comprising a cabinet having two food storage chambers, a freezing shelf disposed above the floor of the first of said chambers in a horizontal position, means for pumping volatile refrigerant through said shelf to refrigerate said first chamber, a controller for said means adapted to maintain the temperature of the first chamber between limits well below the freezing point of water; and a secondary refrigerant circuit for cooling the second of said chambers to a temperature above that maintained in said first chamber, said secondary circuit including an evaporator in said second chamber and a condenser in said first chamber; said freezing shelf comprising an evaporator coil having a plurality of convolutions and means engaging a substantial portion of each of such convolutions and bridging the spaces between them, said means also engaging said condenser to hold it and said evaporator coil assembled in operative relation and to transfer heat from said condenser to said evaporator coil.

7. A refrigerator comprising a cabinet having two food storage chambers, a freezing shelf disposed above the floor of the first of said chambers in a horizontal position, means for pumping volatile refrigerant through said shelf to refrigerate said first chamber, a controller for said means adapted to maintain the temperature of the first chamber between limits well below the freezing point of water; and a secondary refrigerant circuit for cooling the second of said chambers to a temperature above the freezing point of water; said secondary circuit including an evaporator in said second chamber and a condenser in said first chamber; said freezing shelf comprising an evaporator coil having a plurality of convolutions and a metal plate-like portion engaging such convolutions and bridging the spaces between them, said plate-like portion also engaging said condenser to hold it and said evaporator coil assembled in operative relation and to transfer heat from said condenser to said evaporator coil.

8. A freezer-condenser shelf for a refrigerator comprising an evaporator coil having a pluality of convolutions, a condenser coil and a metal plate-like portion engaging the convolutions of said evaporator coil and bridging the spaces between them, said plate-like portion also engaging the convolutions of said condenser coil and serving to hold it in assembled relation with said evaporator coil and to transfer heat from one coil to the other.

THOMAS I. POTTER.